United States Patent
Engelhardt

(12) 
(10) Patent No.: US 6,771,405 B2
(45) Date of Patent: Aug. 3, 2004

(54) METHOD AND APPARATUS FOR SCANNING A SPECIMEN

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/859,240

(22) Filed: May 17, 2001

(65) Prior Publication Data

US 2001/0053018 A1 Dec. 20, 2001

(30) Foreign Application Priority Data

May 19, 2000 (DE) .......................................... 100 24 404

(51) Int. Cl.[7] .............................................. G02B 26/08
(52) U.S. Cl. ..................... 359/202; 359/368; 435/173.1
(58) Field of Search ........................ 600/476; 435/173.1, 435/173.4; 359/368, 369, 201, 202, 212

(56) References Cited

U.S. PATENT DOCUMENTS

| | | | | |
|---|---|---|---|---|
| 3,638,185 A | * | 1/1972 | Dell et al. ................... | 347/247 |
| 4,270,838 A | * | 6/1981 | Furusawa et al. ........... | 359/385 |
| 5,803,911 A | * | 9/1998 | Inukai et al. ................ | 600/387 |
| 5,995,867 A | * | 11/1999 | Zavislan et al. ............. | 600/476 |
| 6,423,960 B1 | * | 7/2002 | Engelhardt et al. ...... | 250/214 R |

\* cited by examiner

*Primary Examiner*—Mark A. Robinson
(74) *Attorney, Agent, or Firm*—Simpson & Simpson, PLLC

(57) ABSTRACT

The present invention concerns a method and an apparatus for scanning a specimen (1) with a light beam (2) of a light source (3), preferably in confocal scanning microscopy, the light beam (2) being deflected with a beam deflection device (4) and the scanning operation being controlled by a control device (5). A specimen can be scanned with the greatest possible timing accuracy in order to trigger a measurement operation, during or shortly after an external influence. The method and the apparatus according to the present invention are characterized in that as a function of at least one definable scan position (10), the control device (5) makes available at least one signal (11) for influencing the specimen (1) and/or for triggering a measurement operation.

20 Claims, 1 Drawing Sheet

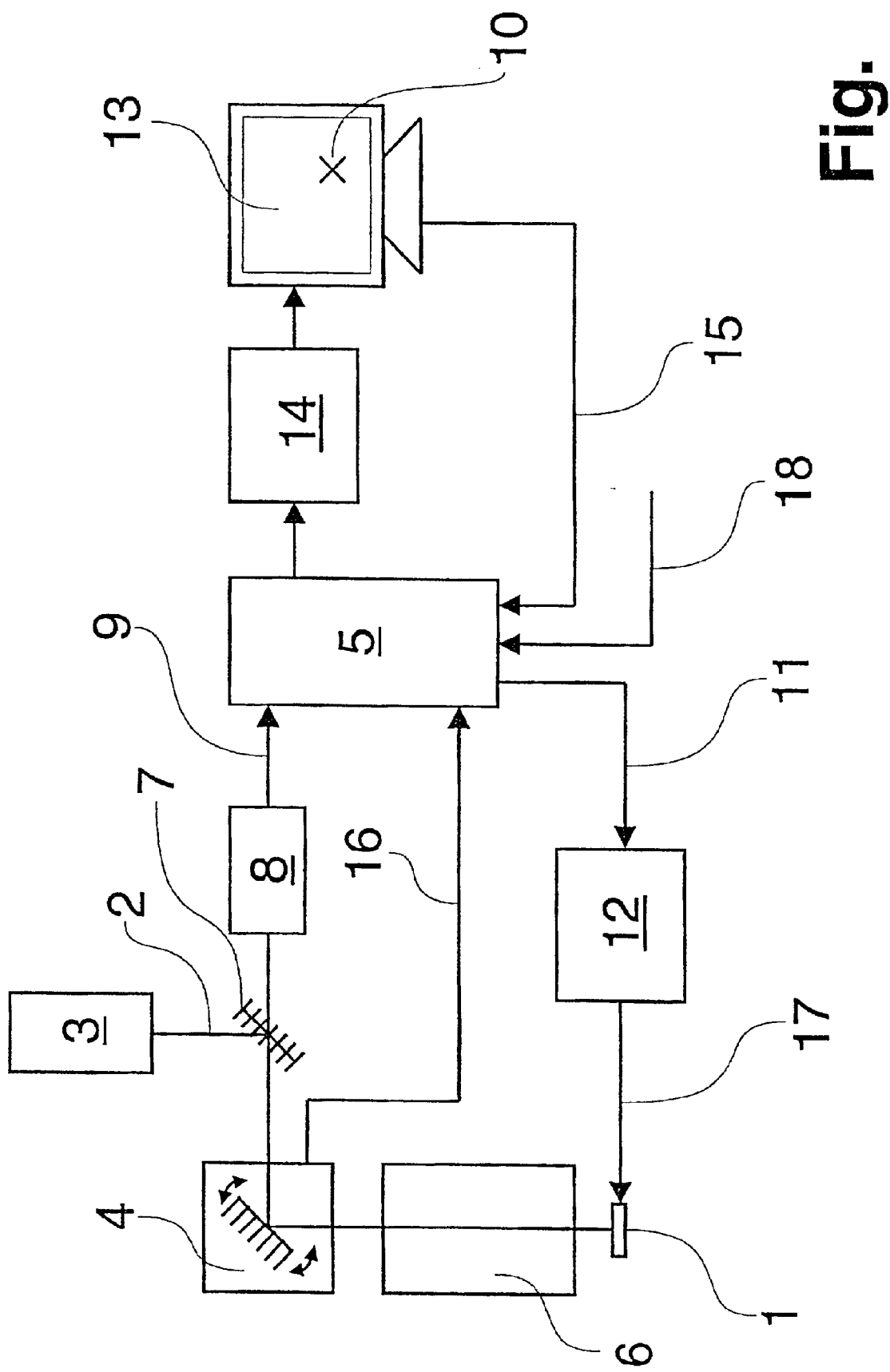

METHOD AND APPARATUS FOR SCANNING A SPECIMEN

CROSS REFERENCE TO RELATED APPLICATIONS

This application claims priority of a German patent application 100 24 404.1 filed May 19, 2000 which is incorporated by reference herein.

FIELD OF THE INVENTION

The present invention concerns a method and an apparatus for scanning a specimen with a light beam of a light source, preferably in confocal scanning microscopy, the light beam being deflected with a beam deflection device and the scanning operation being controlled by a control device.

BACKGROUND OF THE INVENTION

In confocal scanning microscopy, a specimen is scanned with a focused light beam; this is generally achieved by tilting two mirrors arranged in the beam path of the confocal scanning microscope. The focus of the light beam is thereby moved in the focal plane, the deflection directions of the light beam most often being arranged perpendicular to one another so that, for example, one mirror deflects the beam in the X direction and another mirror deflects the beam in the Y direction. The motion or tilting of the mirrors is usually brought about with the aid of galvanometer actuating elements.

The intensity of the light coming from the specimen is measured at definable time intervals during scanning; to generate an image, the light intensity value of a specimen point must be unequivocally allocated to the associated scan position of the light beam. For this purpose, the status data for the adjusting elements of the mirrors, i.e. the galvanometer actuating elements, is usually also continuously measured.

In many applications, especially in physiology, the specimen must be observed with a confocal scanning microscope during or shortly after an external influence. These operations are in most cases highly time-critical, so that the instant of the influence must be synchronized with the scanning operation or an image taken by the confocal scanning microscope. The purpose of the physiological applications is, for example, to apply voltage using the "patch-clamp" technique to the specimen being detected, or to inject chemicals, so as to detect and analyze the specimen's reaction to the influence, during or immediately after the influence, using confocal images.

A direct synchronization of the scanning operation of commercially available confocal scanning microscopes with an external influence on the specimen being examined has not hitherto been provided. As an alternative, an internal electrical line synchronization signal of the control device of the confocal scanning microscope is used to generate a synchronization signal usable for the purpose. This merely makes a signal available to a user at the beginning of each scan line. It is not possible with this synchronization method to ascertain directly when the light beam actually reaches the location in the relevant specimen region being externally influenced. Instead, the user must have a further logic unit count the number of lines until the light beam arrives at the corresponding line of the relevant specimen region. He or she must furthermore have a calculation made, again by an external logic unit, of the time required for the light beam to travel from the beginning of the line to the relevant specimen region. This procedure entails considerable difficulty, however, for example because the scanning speed of the light beam is generally variable and this must be taken into account by the external logic unit. A delay value must therefore be calculated as a function of the scanning speed of the light beam and the corresponding line number or local coordinate. This value must be added to the signal of the first line of an image so that the influence on the specimen can be exerted at the time when the light beam will actually reach the relevant specimen region.

SUMMARY OF THE INVENTION

It is therefore the object of the present invention to describe a method for scanning a specimen with a light beam of a light source, preferably in confocal scanning microscope, with which a specimen can be scanned, with the greatest possibly accuracy in time, in order to trigger a measurement operation during or shortly after an external influence.

The above object is achieved by a method for scanning a specimen with a light beam of a light source comprising the steps of:

deflecting the light beam with a beam deflection device;
controlling scanning operation by a control device;
providing by the control device, as a function of at least one definable scan position, at least one signal; and
influencing thereby the specimen and/or for triggering a measurement operation.

It is a further object of the present invention to provide an apparatus for scanning a specimen with a light beam of a light source, preferably in confocal scanning microscope, with which a specimen can be scanned, with the greatest possibly accuracy in time, in order to trigger a measurement operation during or shortly after an external influence.

The above object is accomplished an apparatus for scanning a specimen with a light beam of a light source, comprising:

a beam deflection device for deflecting the light beam;
a control device for controlling the scanning operation and providing at least one definable scan position and the control device makes available a signal for influencing the specimen and for triggering a measurement operation; and
a logic unit for compensation for differences in the transit time of the scanning light beam.

What has been recognized according to the present invention is firstly that synchronization of the external influence on the specimen and of a measurement operation can be simplified if a signal for influencing the specimen or for triggering the measurement operation is made available by the control device at exactly the correct time. The external logic unit thus becomes superfluous, thus advantageously making possible a direct coupling, for example, between the unit for influencing the specimen and the confocal scanning microscope. In particular, the user no longer needs to program or configure the logic unit, for which purpose the internal details of the change over time in the scanning operation of the light beam must be known, to say nothing of the considerable electronics-related and hardware-related programming knowledge needed for the purpose.

According to the present invention, the control device makes the signal available as a function of at least one definable scan position. This definable scan position could be, for example, exactly the image point that is to be scanned during or after an external influence on the specimen, so that an observation of the reaction of the specimen to the influence is possible by way of an accurately timed image. In very general terms, the definable scan position is a relevant specimen region. Since the control device controls the specimen scanning operation, the control device can be configured in such a way that it also ascertains the instant at which the light beam arrives at the definable scan position.

The local coordinates of the definable scan position could be stipulated on the basis of detected specimen data. For example, a specimen for microinjection could be prepared with a corresponding microinjection apparatus, and this preparation could be performed in a conventional transmitted-light microscopy mode. A confocal scanning microscope image of the specimen would then be detected, the designated focal plane being the specimen plane in which the tip of the microinjection needle is located. On the basis of the detected confocal scanning microscope image, the tip of the microinjection needle could be exactly stipulated as the definable scan position.

Stipulation of the local coordinates of the definable scan position could be accomplished automatically or interactively. For example, the image of the tip of the microinjection needle could be automatically recognized on the basis of its pattern, using a pattern recognition algorithm. Alternatively, the user could interactively stipulate the local coordinates of the definable scan position. It is similarly conceivable, after the automatic determination of a definable scan position, for an additional further definable scan position to be accomplished interactively. For example, in addition to the automatically determined definable scan position (the tip of the microinjection needle), a further definable scan position could be accomplished interactively by the user. For example, a specimen point that has a functional relationship to the microinjection operation could be selected as a further definable scan position. In this example, a signal is thus made available by the control device on the one hand when the scanning light beam reaches the position of the microinjection needle, and on the other hand when the light beam reaches the specimen point.

Interactive stipulation of the local coordinates of the definable scan position is accomplished with the aid of a pointing device, preferably with a computer mouse connected to the control computer of the confocal scanning microscope.

The stipulated local coordinates of the definable scan position are transferred preferably in digitized fashion to the control unit. The definable scan position at which, for example, provision is made for influencing the specimen is then therefore known to the control unit.

Provision is also made for the present position of the light beam to be sensed. For this purpose, for example, the beam deflection device could make available position data about the present position of the light beam. Those position data could be converted into electronically processable data, or digitized. The position data thus rendered electronically processable could be converted into electronically processable data, or digitized. In a subsequent method step, the position data would be conveyed to the control device.

The elapsed time until the signal is made available, or the elapsed time until the light beam reaches the definable scan position, could similarly be converted into electronically processable data, or digitized. Digitization should involve at least 16 bits, since the time spans to be digitized, ranging from seconds to nanoseconds, must be digitally represented with correspondingly high resolution.

In a concrete method step, provision is made for a logic unit to perform the calculation of the elapsed time until the signal is made available, or the elapsed time until the light beam reaches the definable scan position, based on the scanning speed of the light beam and the local coordinates of the definable scan position. This logic unit is preferably associated with the control device, but it could also be incorporated into the control device. Particular scanning modes of the light beam, for example multiple line averaging, are also taken into account by the logic unit. Provision is additionally made for the present position of the light beam to be taken into account in the calculation of the elapsed time.

Provision is furthermore made for a comparison between the position data for the light beam during scanning and the position datum for the definable scan position. Provision is additionally made for a comparison between the actual position of the beam deflection device (i.e. of the light beam) and the reference position defined by the control device, which represents an important prerequisite in particular for highly accurate synchronization. This method step, too, could be performed by a logic unit that is also incorporated into the control device.

In particularly advantageous fashion, the control unit makes the signal for influencing the specimen and/or for triggering a measurement operation available before and/or after the light beam reaches the definable scan position. Particularly if the control device makes the signal available before the light beam reaches the definable scan position, it is possible thereby to compensate for a corresponding delay time, which corresponds, for example, to the reaction/ activation time of the apparatus for influencing the specimen. Especially in "caged compound" applications in which the influence on the specimen is brought about by the light beam itself, it can be greatly advantageous if the signal is not made available until the light beam has reached the definable scan position. In this case, for example, a measurement of the change in the electrical potential of a cell membrane could be triggered, i.e. a measurement operation could be performed at a well-defined time.

In particularly advantageous fashion, a time span is defined between the arrival of the light beam at the definable scan position and the provision of the signal. This definition can take into account a possible activation time of the apparatus for influencing the specimen, specifically when the apparatus for influencing the specimen requires a certain time in order ultimately to influence the specimen. In this case the time span would need to be selected in such a way that the control device makes the signal available before the light beam reaches the definable scan position.

For a number of applications, provision is made for the signal of the control device to be made available as the light beam reaches the definable scan position. This would make possible exact synchronization of the light beam with the influencing of the specimen and/or the triggering of a measurement operation. The range within which a time discrepancy between the two events—the arrival of the light beam at the definable scan position and the provision of the signal—can be tolerated depends on the individual case, and defines a time window which in turn defines simultaneity for the corresponding application.

The control device preferably makes an electrical signal available. An optical or acoustic signal would also be conceivable. An optical signal could, for example, be important in terms of zero-potential transfer of the signal, especially in patch-clamp applications, since in this context, inter alia, very small voltages and/or currents of the specimen are measured, and electrical decoupling of the confocal scanning microscope from the apparatus for influencing or measuring the specimen represents an important parameter for this purpose.

The apparatus according to the present invention for scanning a specimen with a light beam of a light source can, in this context, be implemented in a confocal scanning microscope, the light beam being deflectable with a beam deflection device. The beam deflection device usually comprises one or two mirrors that are pivoted or rotated by galvanometer actuating elements. In the context of a confocal scanning microscope, the scanning operation is generally controlled by a control device.

According to the present invention, the control device makes available, as a function of at least one definable scan position, a signal for influencing the specimen and/or for triggering a measurement operation. The confocal scanning microscope according to the present invention accordingly has an electronic and/or optical interface at which the signal for influencing the specimen or for triggering a measurement operation can be picked off for a corresponding influencing or measuring device.

In a preferred embodiment, in the interest of high timing accuracy a concrete logic unit, which is capable of compensating for differences in the transit time of the scanning beam, is provided. This logic unit is preferably associated with the control device, since the control device usually also makes available the position data about the instantaneous position of the light beam from the beam deflection unit.

In particularly advantageous fashion, data processing in the logic unit and in the control device is accomplished with field-programmable gate arrays (FPGAs). An FPGA is a programmable digital electronic device with which a considerable processing speed can be achieved with quasi-hardware data processing. At present, for example, up to approximately 250 MIPS (million instructions per second) can be executed, thus making possible information processing even at high light beam scanning speeds. A substantial advantage of using FPGAs, however, is their absolute real-time capability, which makes possible reproducible processing with a guaranteed response in the nanosecond range.

In particularly advantageous fashion, a high light beam scanning rate is achievable because of this high timing accuracy of the control device or logic unit equipped with FPGAs. As a result, it is advantageously possible for even very short-duration events—or specimen reactions to an external influence—to be not only detected in accurately timed fashion but also documented and logged with sufficient time resolution. Data processing is accordingly accomplished at least almost in real time.

BRIEF DESCRIPTION OF THE DRAWING

There are various ways of advantageously embodying and developing the teaching of the present invention. Reference is made drawings. In the drawings, the single FIGURE schematically depicts an apparatus according to the present invention for carrying out a method according to the present invention.

DETAILED DESCRIPTION OF THE INVENTION

The single FIGURE shows an apparatus for scanning a specimen 1 with a light beam 2 of a light source 3 of a confocal scanning microscope. Light beam 2 is deflectable with a beam deflection device 4. The light beam scanning operation is controlled by a control device 5. Following deflection by beam deflection device 4, light beam 2 passes through microscope optical system 6. Beam deflection device 4 comprises a gimbal-mounted mirror which deflects the light beam in two mutually perpendicular directions. Reflected light and/or fluorescent light from the specimen passes through microscope optical system 6 and beam deflection device 4 in the opposite direction, and after passing through beam splitter 7 can be detected by detector 8. Detector 8 supplies digitized intensity values 9 to control device 5.

According to the present invention, a signal 11 for influencing specimen 1 is made available by control device 5 as a function of a definable scan position 10. The influence on specimen 1 is exerted via a patch clamp device 12 with which specimen 1 can be impinged upon by electrical voltage, and with which chemicals or fluorescent dyes can also be injected into the specimen.

The local coordinates of the definable scan position 10 are stipulated on the basis of detected specimen data. For that purpose, first a two-dimensional confocal image of specimen 1 is recorded and displayed on image output unit 13 of computer system 14. Stipulation of the local coordinates of definable scan position 10 is accomplished interactively by the user of the confocal scanning microscope, with the aid of a computer mouse (not depicted). The local coordinates of definable scan position 10 are transferred in digitized fashion via line 15 to control unit 5.

The present position of light beam 2 during the scanning operation is sensed by control unit 5. For that purpose, beam deflection device 4 makes available position data 16 that are conveyed in digitized form to control device 5.

Control device 5 then determines, again in digitized form, the time span between the provision of signal 11 or in other words the elapsed time until the light beam 2 reaches the definable scan position. The scanning speed of the light beam 2 and the instantaneous position of the light beam 2 are incorporated into this determination. The present position data 16 for the light beam are compared, during scanning, to the position data for definable scan position 10.

In this concrete application, control device 5 is configured in such a way that it makes signal 11 available exactly 250 ns before light beam 2 reaches definable scan position 10. That 250 ns is exactly the time required for patch clamp device 12, with the corresponding manipulators 17 (shown only schematically), ultimately to influence specimen 1 in the desired fashion. The time span (i.e. the 250 ns) between the arrival of light beam 2 at definable position 10 and the provision of signal 11 is entered into control device 5 via input means 18.

Control device 5 makes an optical signal 11 available to patch clamp device 12, optical signal 11 being simply a single light pulse. Since patch clamp device 12 with manipulators 17 has a reaction time of 250 ns, the influencing of the specimen and the arrival of light beam 2 at definable scan position 10 occur simultaneously.

| PARTS LIST | |
|---|---|
| 1 | Specimen |
| 2 | Light beam |
| 3 | Light source |
| 4 | Beam deflection device |
| 5 | Control device |
| 6 | Microscope optical system |

-continued

PARTS LIST

| | |
|---|---|
| 7 | Beam splitter |
| 8 | Detector |
| 9 | Intensity values |
| 10 | Definable scan position |
| 11 | Signal |
| 12 | Patch clamp device |
| 13 | Image output unit |
| 14 | Computer system |
| 15 | Line |
| 16 | Position data of (4) |
| 17 | Manipulators of (12) |
| 18 | Input means |

What is claimed is:

1. A method for scanning a specimen (1) with a light beam (2) of a light source (3), comprising the steps of:
   deflecting the light beam (2) with a beam deflection device (4);
   controlling scanning operation by a control device (5);
   defining at least one scan position;
   determining by said control device a time span between a provision of at least one signal (11) at said at least one scan position and the arrival of said light beam at said at least one scan position; and,
   triggering by said control device (5) the provision of said at least one signal (11) so that said light beam arrives at said at least one defined scan position after said determined time span.

2. The method as defined in claim 1, comprising the additional step of automatically stipulating local coordinates of the definable scan position (10) based on detected specimen data and transferring said coordinates in digitized fashion to the control device.

3. The method as defined in claim 1, comprising the additional step of interactively stipulating local coordinates of the definable scan position (10) with the aid of a pointing device.

4. The method recited in claim 3 wherein said pointing device is a mouse.

5. The method as defined in claim 1, comprising additional step of sensing the present position of the light beam (2) wherein available position data (16) about the present position of the light beam (2) are provided by the beam deflection device (4).

6. The method as defined in claim 5, comprising the additional step of conveying the position data (16) to the control device (5).

7. The method as defined in claim 6, comprising the additional step of performing the calculation of the elapsed time until the signal is made available, or the elapsed time until the light beam reaches the definable scan position (10), based on the scanning speed of the light beam (2) and the local coordinates of the definable scan position (10) with a logic unit associated with the control device (5).

8. The method as defined in claim 7, comprising the additional step of calculating said elapsed time based on the present position of the light beam (2).

9. The method as defined in claim 8, comprising the additional step of comparing the present position data (16) for the light beam (2) to a position datum for the definable scan position (10).

10. The method as defined in claim 1, comprising the additional step of making the signal (11) available by the control unit (5) at a time span before or after the light beam reaches the definable scan position (10).

11. The method as defined in claim 1, comprising the additional step of making the signal (11) available by the control unit (5) when the light beam reaches the definable scan position (10).

12. The method as defined in claim 1, wherein the specimen (1) is scanned with a light beam (2) of a light source (3) of a confocal scanning microscope.

13. The method recited in claim 1 wherein said first and said second times are equal to each other.

14. An apparatus for scanning a specimen (1) with a light beam (2) of a light source (3), comprising:
   a beam deflection device (4) for deflecting the light beam (2);
   a control device (5) for controlling a scanning operation and providing at least one definable scan position (10) and the control device (5) makes available a signal (11) for influencing the specimen (1) at a time span before said light beam arrives at said at least one definable scan position; and
   a logic unit for compensation for differences in the transit time of the scanning light beam (2).

15. The apparatus as defined in claim 14, characterized in that the control device (5) has a high timing accuracy wherein a high scanning rate is provided.

16. The apparatus as defined in claim 15, characterized in that the control device (5) performs data processing at least almost in real time.

17. The apparatus as defined in claim 16 characterized in that the control device (5) is equipped with field-programmable gate arrays FPGAs.

18. The apparatus as defined in claim 14 characterized in that an image output unit (13) is associated with an apparatus for displaying a recorded image of the specimen (1) and wherein stipulation of the local coordinates of the definable scan position (10) is accomplished with the aid of a pointing device.

19. The apparatus as defined in claim 14, characterized in that the apparatus is a confocal scanning microscope.

20. A method for scanning a specimen (1) with a light beam (2) of a light source (3), comprising the steps of:
   deflecting the light beam (2) with a beam deflection device (4);
   controlling scanning operation by a control device (5);
   defining at least one scan position;
   determining by the control device (5) a time span between a provision of at least one signal (11) at said at least one scan position and the arrival of said light beam at said at least one scan position; and,
   triggering by said control device (5) the provision of said at least one signal (11) so that said light beam arrives at said at least one definable scan position after said determined time span, wherein the provision of said at least one signal comprises an action selected from the group consisting of: applying a voltage across the specimen, injecting a chemical into the specimen, and injecting a dye into the.

* * * * *